Patented Sept. 12, 1939

2,172,967

UNITED STATES PATENT OFFICE 2,172,967

NICKEL ALLOY FOR ELECTRODES

Jan Hendrik de Boer and Gottfried Bruno Jonas, Eindhoven, Netherlands, assignors to N. V. Philips' Gloeilampenfabrieken, Eindhoven, Netherlands No Drawing. Application February 13, 1937, Serial No. 125,655. In Germany February 17, 1936

1 Claim. (Cl. 250—27.5)

This invention relates to bodies which mainly consist of nickel or nickel alloys and more particularly to electrodes for electric discharge vessels or incandescent lamps made from this material.

When nickel is used, for instance, for electrodes and other parts of discharge tubes and incandescent lamps, such as is very often the case in practice, then the nickel used for this purpose is given a small addition of another metal, in most cases manganese and frequently also magnesium, so that the nickel can be more easily worked. In fact, pure nickel is extremely difficultly workable which is mainly due to sulphur compounds contained therein. The manganese added acts, so to say, as a desulphurator.

When nickel bodies are used for definite purposes, more particularly in exhausted discharge vessels, manganese evaporates from the nickel which may cause a manganese deposit on the wall of the tube, in particular when nickel is used for cathode bodies of electric discharge tubes. In the last-mentioned use it also frequently occurs that manganese issues from the nickel and soils the layer of emitting substance such as barium oxide available on the nickel.

We have now found that by using bodies according to the invention excellent results can be obtained. Such bodies mainly consist of nickel or nickel alloy to which is added a small quantity of zirconium. The addition of 0.05 to 3% zirconium has turned out to be particularly suitable.

It has been found that bodies made from this material are easily workable. Thus it is very easy to make from this material electrodes for electric discharge tubes and incandescent lamps such as cathode bodies or supply wires. Again it has been found that from bodies according to the invention much smaller quantities of gas are set free than from bodies consisting of other kinds of nickel. In addition the tensile strength at high temperatures is better than that of manganese nickel. At a temperature of 750° C., for instance, the tensile strength of zirconium nickel is very considerable, whereas that of manganese nickel has appreciably fallen at this temperature.

A body according to the invention can be established as follows:

1 kg. of pure nickel, for instance, that which is marketed as "Mondnickel", is melted in an aluminium oxide crucible, which is preferably heated up to about 1500° C. in a resistance furnace in non-oxidizing surroundings. To the molten mass is added 15 gms. of pure zirconium in the form of small pieces. This zirconium readily dissolves in the molten nickel whereupon the molten mass is poured out in sand moulds or in chills, for instance in the form of rods having a diameter of 15 x 15 mms. After cooling down the surface of the rods is cleaned and after that they are swaged or rolled at about 750° to 800° C. Then the further well known mechanical treatments are carried out in order to give the objects the desired shape. The objects thus established in the form of wires, for instance, have a tensile strength of 24.5 kg/mm² at 770° C. At the same temperature a wire of nickel containing manganese had a tensile strength of 9.2 kg/mm² only. In vacua the delivery gas is materially smaller than that of the nickel containing manganese and amounts only to one third or one quarter. These data are given only by way of example. It is also possible to melt in other crucible material (such as MgO, $ZrO_2$) and in other furnaces, for instance, in induction furnaces with magnesite lining. The zirconium need not be added as pure zirconium, since it is also possible to start with zirconium alloys such as marketed zirconium-titanium-alloys or zirconium-nickel-alloys.

What we claim is:

An exhausted discharge device comprising an envelope, a gas-free electrode of wrought metal, which sets free substantially smaller quantities of gas than nickel when heated in a vacuum, in said envelope, said metal consisting entirely of nickel alloyed with from .05% to 3.0% zirconium.

JAN HENDRIK de BOER.
GOTTFRIED BRUNO JONAS.